United States Patent
Bretagna

(10) Patent No.: US 9,668,614 B1
(45) Date of Patent: Jun. 6, 2017

(54) DISPOSABLE INSERT OVEN GRATE SYSTEM

(71) Applicant: John Bretagna, Palm harbor, FL (US)

(72) Inventor: John Bretagna, Palm harbor, FL (US)

( * ) Notice: Subject to any disclaimer, the term of this patent is extended or adjusted under 35 U.S.C. 154(b) by 0 days.

(21) Appl. No.: 15/139,414

(22) Filed: Apr. 27, 2016

(51) Int. Cl.
| | |
|---|---|
| *A47J 37/07* | (2006.01) |
| *F24C 15/00* | (2006.01) |
| *A47J 27/00* | (2006.01) |
| *A47J 37/06* | (2006.01) |
| *A47J 36/02* | (2006.01) |
| *A47J 36/20* | (2006.01) |
| *A47J 36/00* | (2006.01) |

(52) U.S. Cl.
CPC ........... *A47J 37/0694* (2013.01); *A47J 36/00* (2013.01); *A47J 36/022* (2013.01); *A47J 36/20* (2013.01)

(58) Field of Classification Search
CPC ...................................................... A47J 36/206
USPC .................................. 126/9 A, 39 M; 99/446
See application file for complete search history.

(56) References Cited

U.S. PATENT DOCUMENTS

| | | | | |
|---|---|---|---|---|
| 2,216,457 A | * | 10/1940 | Salisbury | A47J 36/20 126/211 |
| 4,186,217 A | * | 1/1980 | Tchack | A47J 36/022 206/513 |
| 5,006,684 A | * | 4/1991 | Wendt | B65D 81/34 219/729 |

* cited by examiner

*Primary Examiner* — Williams G Corboy

(57) ABSTRACT

A disposable pan has an imperforate bottom in a rectangular configuration with front, rear, and side edges. Sides extend upwardly from the bottom. The sides have free upper ends forming an upper opening. A grill has a periphery in a rectangular configuration. The periphery has a front wire, a rear wire, and side wires. The grill has a plurality of central wires. The central wires extend between the front wire and the rear wire and between and parallel with the side wires. The grill has support wires extending between the front and rear wires adjacent to and parallel with each side wire. Each support wire has downwardly extending bends forming legs positioned on the bottom of the pan. The grill has transverse wires with ends coupled to the side wires. Each wire is formed of aluminum foil in a spiral cross sectional configuration.

1 Claim, 1 Drawing Sheet

DISPOSABLE INSERT OVEN GRATE SYSTEM

BACKGROUND OF THE INVENTION

Field of the Invention

The present invention relates to a disposable insert oven grate system and more particularly pertains to grilling food in an oven on a disposable grill in a disposable pan, the grilling of food and the disposing of the pan and grill being done in a safe, healthy, convenient, and economical manner.

Description of the Prior Art

The use of grills and pans is known in the prior art. More specifically, grills and pans previously devised and utilized for the purpose of cooking are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, the prior art does not describe a disposable insert oven grate system that allows for cooking and disposing in a safe, healthy, convenient, and economic manner.

In this respect, the disposable insert oven grate system according to the present invention substantially departs from the conventional concepts and designs of the prior art, and in doing so provides an apparatus primarily developed for the purpose of cooking and disposing in a safe, healthy, convenient, and economic manner.

Therefore, it can be appreciated that there exists a continuing need for a new and improved disposable insert oven grate system which can be used for cooking and disposing in a safe, healthy, convenient, and economic manner. In this regard, the present invention substantially fulfills this need.

SUMMARY OF THE INVENTION

In view of the disadvantages inherent in the known types of pans and grills now present in the prior art, the present invention provides an improved disposable insert oven grate system. As such, the general purpose of the present invention, which will be described subsequently in greater detail, is to provide a new and improved disposable insert oven grate system and method which has all the advantages of the prior art and none of the disadvantages.

To attain this, the present invention essentially comprises a disposable insert oven grate system comprising a disposable pan and a disposable grill. The disposable pan has an imperforate bottom in a rectangular configuration with front, rear and side edges. The disposable pan has sides extending upwardly from the bottom. The sides have free upper ends forming an upper opening. The disposable grill has a periphery in a rectangular configuration. The periphery has a front wire, a rear wire, and side wires. The grill has a plurality of central wires. The central wires extend between the front wire and the rear wire. The central wires are between and parallel with the side wires. The grill has support wires extending between the front and rear wires adjacent to and parallel with the side wires. Each support wire has downwardly extending bends forming legs. The legs are positioned on the bottom of the pan. The grill has transverse wires with ends coupled to the side wires. Each wire is formed of aluminum foil in a spiral cross sectional configuration.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved disposable insert oven grate system which has all of the advantages of the prior art pans and grills and none of the disadvantages.

It is another object of the present invention to provide a new and improved disposable insert oven grate system which may be easily and efficiently manufactured and marketed.

It is a further object of the present invention to provide a new and improved disposable insert oven grate system which is of durable and reliable constructions.

An even further object of the present invention is to provide a new and improved disposable insert oven grate system which is susceptible of a low cost of manufacture with regard to both materials and labor, and which accordingly is then susceptible of low prices of sale to the consuming public, thereby making such disposable insert oven grate system economically available to the buying public.

Even still another object of the present invention is to provide a disposable insert oven grate system for grilling purposes.

Lastly, it is an object of the present invention to provide a new and improved disposable insert oven grate system for grilling food in an oven on a disposable grill in a disposable pan, the grilling of food and the disposing of the pan and grill being done in a safe, healthy, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawing wherein.

The same reference numerals refer to the same parts throughout the Figure.

DESCRIPTION OF THE PREFERRED EMBODIMENT

Figures 1, 2:
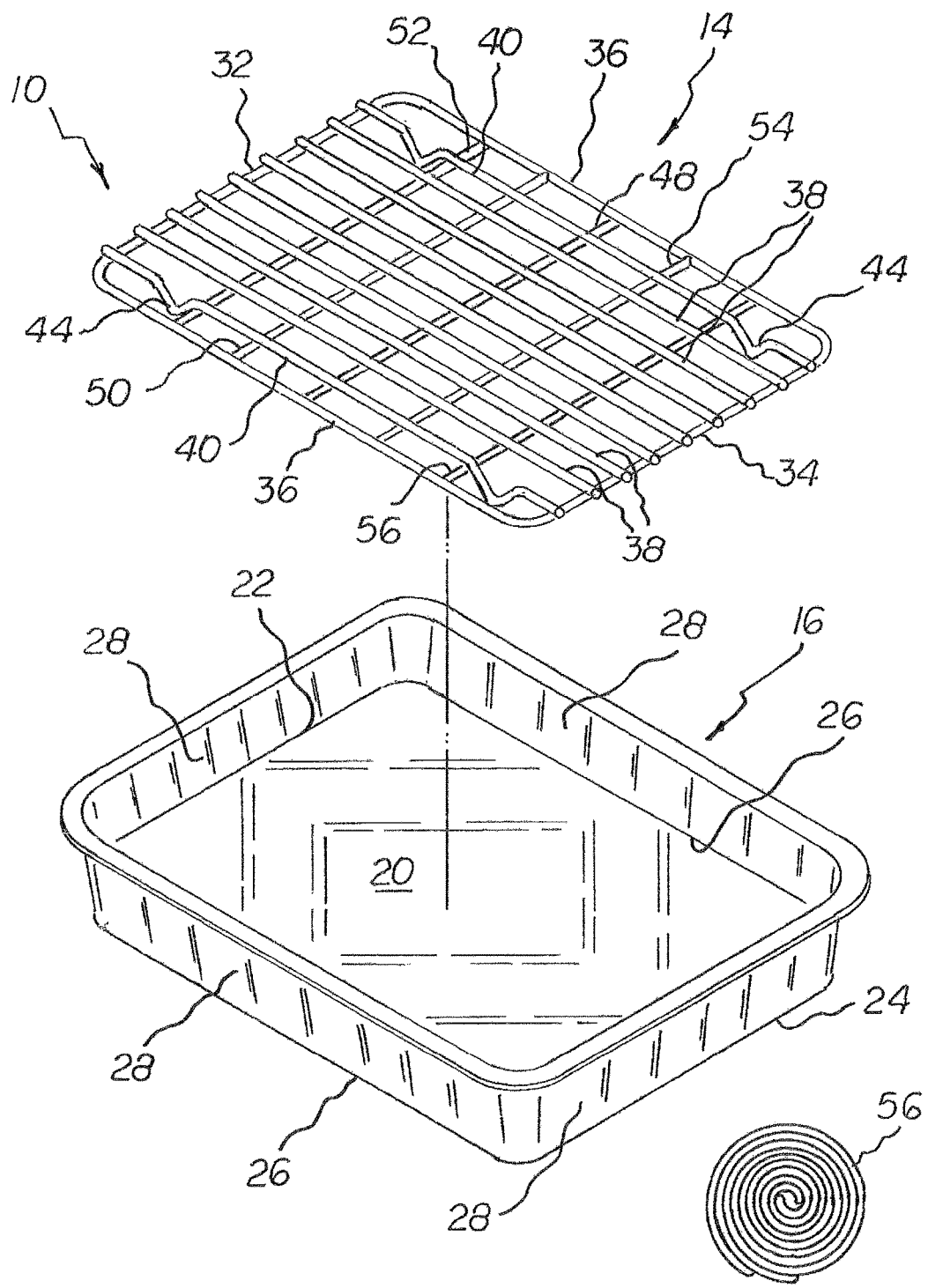
FIG. 1 is an exploded perspective illustration of a disposable insert oven grate system constructed in accordance with the principles of the present invention.
FIG. 2 is a cross sectional illustration of one of the plurality of wires.

With reference now to the drawings, and in particular to FIG. 1 thereof, the preferred embodiment of the new and improved disposable insert oven grate system embodying the principles and concepts of the present invention and generally designated by the reference numeral 10 will be described.

The present invention, the disposable insert oven grate system 10 is comprised of a plurality of components. Such components are individually configured and correlated with respect to each other so as to attain the desired objective. In their broadest context such include a pan and a grill.

In this broad context, first provided is a disposable pan. The pan has an imperforate bottom in a rectangular configuration. The bottom has front, rear, and side edges. The pan has sides extending upwardly from the bottom. The sides have free upper ends. In this manner, an upper opening is formed.

Also, in this broad context, a disposable grill is provided. The grill has a periphery in a rectangular configuration. The periphery has a front wire, a rear wire, and side wires. The grill has a plurality of central wires. The central wires extend between the front wire and the rear wire and are between and parallel with the side wires. The grill has support wires. The support wires extend between the front and rear wires adjacent to and parallel with the side wires. Each support wire has downwardly extending bends forming legs. The legs are positioned on the bottom of the pan. The grill has transverse wires with ends coupled to the side wires. Each wire is formed of aluminum foil in a spiral cross sectional configuration. Such components are individually configured and correlated with respect to each other so as to attain the desired objective.

In the preferred embodiment of the disposable insert oven grate system, designated by reference numeral 10, first provided is the pan 16. The pan is disposable. The pan has an imperforate bottom 20. The bottom is in a rectangular configuration. The bottom has a front edge 22. The bottom has a rear edge 24. The front and rear edges are separated by a length of 11¾ inches, plus or minus 5 percent. The bottom has side edges 26. The side edges are separated by a width of 8 inches, plus or minus 5 percent. The pan has imperforate sides 28. Each side is in a trapezoidal configuration. Each side extends upwardly from the front, rear, and side edges of the bottom. In this manner an angle of between 10 and 20 degrees with respect to the bottom is formed. The sides have lower ends. The lower ends are integrally formed with the bottom. The sides have free upper ends. In this manner an upper opening is formed. The pan forms a chamber. The chamber is between the bottom and the upper opening and within the sides. The chamber has a height of 1⅞ inches, plus or minus 5 percent, between the bottom and the upper opening. The pan is fabricated of aluminum foil. The aluminum foil has a thickness of from 0.0030 inches to 0.0065 inches.

Provided last is a grill 14. The grill is disposable. The grill has a periphery. The periphery is in a rectangular configuration. The periphery has a front wire 32. The periphery has a rear wire 34. The front and rear wires are separated by a length. The periphery has two side wires 36. The side wires are separated by a width. The grill has a plurality of central wires 38. The central wires extend between the front and rear wires and are between and parallel with the side wires. The grill has two support wires 40. Each support wire extends between the front and rear wires. Each support wire is located adjacent to and parallel with an associated side wire. Each support wire has downwardly extending v-shaped bends 44. The bends form legs. The legs are positioned on the bottom of the pan. In this manner, the front, rear, side, support, and central wires are held in a plane at an intermediate elevation of the chamber. The grill has a plurality of transverse wires. Each transverse wire has opposed ends. The opposed ends of the transverse wires are attached to the side wires. Each transverse wire has a central extent parallel with the front and rear wires. Each transverse wire has an upper surface beneath the support wires. In this manner support is provided to the support wires between the legs. All of the wires are fabricated of aluminum.

In the preferred embodiment, the grill is totally fabricated of wire formed of aluminum foil wrapped into a spiral cross sectional configuration. The aluminum foil has in initial thickness of from 0.00060 inches to 0.0065 inches prior to forming the spirals. When rolled into spirals, lineal wires are formed with a circular cross sectional configuration having a diameter of from 0.125 inches to 0.250 inches. The wires form an upper surface for supporting food to be cooked. The wires are closely spaced longitudinally at from 1.00 inches to 1.25 inches. The wires are widely spaced latitudinally at from 2.0 inches to 3.0 inches. This results in the use of a middle wire 48 and a front wire 32 and a rear wire 34 and two intermediate wires 50, 52 between the middle wire and the front wire and two additional intermediate wires 54, 56 between the middle wire and the rear wire. The upper surface of the wires provides a rectangular configuration with a length of from 13 inches to 18 inches and a width of from 9 inches to 12 inches.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A disposable insert oven grate system (10) comprising, in combination:

a pan (16), the pan being disposable, the pan having an imperforate bottom (20) in a rectangular configuration, the bottom having a front edge (22) and a rear edge (24) separated by a length of 11¾ inches, plus or minus 5 percent, the bottom having side edges (26), the side edges separated by a width of 8 inches, plus or minus 5 percent, the pan having imperforate sides (28), each side being in a trapezoidal configuration, each side extending upwardly from the front edge and rear edge and side edges of the bottom thereby forming an angle of between 10 degrees and 20 degrees with respect to the bottom, the sides having lower ends, the lower ends being integrally formed with the bottom, the sides having free upper ends forming an upper opening, the pan forming a chamber between the bottom and the upper opening and within the sides, the chamber having a height of 1⅞ inches, plus or minus 5 percent, between the bottom and the upper opening, the pan being fabricated of aluminum foil having a thickness of from 0.0030 inches to 0.0065 inches; and a grill (14), the grill being disposable, the grill having a periphery in a rectangular configuration, the periphery having a front wire (32) and a rear wire (34) separated by a length of between 13 and 14 inches, the periphery having two side wires 36, the side wires being separated by a width of between 9 and 10 inches, the grill having a plurality of central wires (38), the central wires extending between the front and rear wires, the central wires being provided between and parallel with the side wires, the grill having two support wires (40), each support wire extending between the front and rear wires, each support wire being located adjacent to and parallel with an associated side wire, each support wire having downwardly extending v-shaped bends (44) the bends forming legs, the legs being positioned on the bottom of the pan whereby the front wire and the rear wire and the central wires are held in a plane at an intermediate elevation of the chamber, the grill having a plurality of transverse wires, each transverse wire having opposed ends, the opposed ends of the transverse wires being attached to the side wires, each transverse wire having a central extent, the central extents being parallel with the front wire and the rear wire, each transverse wire having an upper surface beneath the support wires whereby support is provided to the support wires between the legs, the side wires being spaced by a width, the rack is totally formed of wire fabricated of aluminum foil wrapped in a spiral cross sectional shape, the aluminum foil having an initial thickness of from 0.00060 inches to 0.0065 inches prior to forming the spiral cross sectional shape, when rolled into spirals lineal wires are formed with a circular cross sectional configuration having a diameter of from 0.125 inches to 0.250 inches, the wires forming an upper surface for supporting food to be cooked, the wires being closely spaced longitudinally from 1.00 inches to 1.25 inches, the wires being widely spaced latitudinally at from 2.0 inches to 3.0 inches, thereby resulting in the use of a middle wire (48) and a front wire (32) and a second end wire (34) and two intermediate wires (50), (52) between the middle wire and the front wire and two additional intermediate wires (54), (56) between the middle wire and the rear wire.

* * * * *